United States Patent [19]

Parker et al.

[11] 3,986,922

[45] Oct. 19, 1976

[54] METHOD OF DEINKING PRINTED WASTE CELLULOSIC STOCK

[75] Inventors: Edward T. Parker, Inkster; Clyde G. Inks, Taylor, both of Mich.

[73] Assignee: BASF Wyandotte Corporation, Wyandotte, Mich.

[22] Filed: Apr. 14, 1975

[21] Appl. No.: 567,924

[52] U.S. Cl. .................................. 162/5; 162/8
[51] Int. Cl.² ........................................ D21C 5/02
[58] Field of Search ............... 162/5, 8; 260/950; 252/526

[56] References Cited
UNITED STATES PATENTS

| | | |
|---|---|---|
| 3,098,784 | 7/1963 | Gorman .............................. 162/5 |
| 3,122,508 | 2/1964 | Grifo et al. ........................ 252/526 |
| 3,354,026 | 11/1967 | Illingsworth ......................... 162/5 |
| 3,377,234 | 4/1968 | Illingworth .......................... 162/5 |
| 3,392,083 | 7/1968 | Illingworth .......................... 162/5 |
| 3,462,520 | 8/1969 | Nehmsmann et al. ............... 260/950 |

*Primary Examiner*—S. Leon Bashore
*Assistant Examiner*—William F. Smith
*Attorney, Agent, or Firm*—Joseph D. Michaels; Bernhard R. Swick; Robert E. Dunn

[57] ABSTRACT

Printed waste cellulosic stock can be efficiently deinked by pulping the stock in the presence of based on the weight of the stock from 0.5 to 2% by weight of an alkali metal hydroxide and from 0.3 to 0.7% by weight of certain phosphate mono and diesters anionic surfactants.

4 Claims, No Drawings

METHOD OF DEINKING PRINTED WASTE CELLULOSIC STOCK

BACKGROUND OF THE INVENTION

1. Field Of The Invention

The present invention relates to a method of deinking printed cellulosic stock including clay and carbonate coated stock. More particularly, the invention relates to the deinking of printed cellulosic stock in the presence of an alkali metal hydroxide and certain phosphate ester anionic surfactants.

2. Prior Art

The deinking of waste cellulosic stock employing surface active agents is well known in the art, as evidenced by U.S. Pat. Nos. 3,098,784; 3,377,234, and 3,392,083. The present invention relates to an improvement in the processes described therein.

SUMMARY OF THE INVENTION

In accordance with the present invention, waste printed cellulosic stock can be effectively deinked by utilizing as the deinking agent certain phosphate ester anionic surfactants. Use of these surfactants in the deinking process provides a pulp substantially equal and often superior in brightness and color to that of virgin pulp without subsequent treatment with bleaching agents. Moreover, use of the anionic surfactant allows for the employment of lower concentrations of caustic than heretofore believed effective in deinking processes.

DESCRIPTION OF THE PREFERRED EMBODIMENTS

The present invention relates to a method of deinking printed waste cellulosic pulp which comprises pulping said stock in an aqueous solution containing from 0.5 to 2% by weight of an alkali metal hydroxide based on the weight of stock and from 0.3 to 0.7% by weight of certain phosphate ester anionic surfactants based on the weight of stock. The anionic surfactants of use in the invention are phosphate esters of nonionic surfactants represented by the formula:

wherein R is an alcoholic residue or alkyl group having from ten to eighteen carbon atoms or mixtures thereof, A is either oxyethylene groups or a mixture of oxyethylene and oxypropylene groups in an ethylene oxide to propylene oxide weight ratio of from 0.5:1 to 6:1, and $n$ is an integer sufficiently large to ensure that A constitutes from 40 to 85% of the total weight of the surfactant.

As is known in the art, when a mixture of compounds of the type used herein is employed there is generated a series of closely related homologs having varying oxyalkylene chain lengths. Thus, the values indicated above are average values. Typical of these nonionic surfactants are those disclosed and claimed in U.S. Pat. Nos. 3,340,309; 3,504,041, and 3,770,701.

The phosphate ester anionic surfactants are prepared by reacting the nonionic surfactant with a polyphosphoric acid. Generally, the polyphosphoric acid is used in excess over stoichiometric requirements. The phosphate ester obtained by this reaction is a mixture of mono- and diesters corresponding to the formulae:

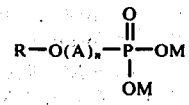

and

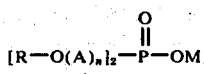

wherein M is hydrogen, ammonia, or an alkali metal such as sodium or potassium, R and A have the meanings ascribed to R and A, above, and wherein the mixture comprises from 60 to 100% by weight of monoester and from 40 to 0% by weight of diester and A constitutes from about 30 to 80% of the total weight of the ester. These surfactants and methods for their preparation are more completely described in U.S. Pat. Nos. 3,122,508; 3,294,683, and 3,462,520.

Preferred phosphate esters of use in the present invention include:

Surfactant A - A phosphate monoester of the formula:

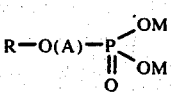

wherein M is hydrogen, R is a mixture of $C_{12}$–$C_{15}$ alkyl groups and A is a mixture of oxyethylene and oxypropylene groups in a weight ratio of 1.5:1, respectively, the oxyalkylene groups constituting about 63% by weight of the ester.

Surfactant B - A phosphate monoester of the formula:

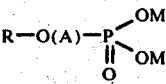

wherein M is hydrogen, R is a mixture of $C_{10}$–$C_{12}$ alkyl groups and A is a mixture of oxyethylene and oxypropylene groups in a respective weight ratio of about 5.7:1, the oxyalkylene groups constituting about 65% by weight of the ester.

Surfactant C - A phosphate monoester of the formula:

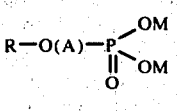

wherein M is hydrogen, R is a mixture of $C_{12}$–$C_{15}$ alkyl groups and A is a mixture of oxyethylene and oxypropylene groups in a respective weight ratio of about 3:1, the oxyalkylene groups constituting about 65% by weight of the ester.

In carrying out the process of the subject invention, water is charged to a reactor or pulper and the waste stock is added thereto. The printed cellulosic charge may, if desired, be shredded by appropriate means prior to treatment. This, however, is not necessary, and the waste material may be added to the treating solution without shredding or without any subdivision in size whatsoever. Thus, the waste material to be deinked is preferably added to the treating solution in its naturally dry condition, i.e., without being subjected to moisture or water other than that which is normally present in the atmosphere. The amount of the waste stock added to the treating solution should be controlled. In general, the percent of cellulosic material by weight of the aqueous treating solution should be below 10% and preferably below 6.0%, more preferably about 2.0 and 6.0%. Good results are obtained when the deinking solution contains about 2 to 2.5% by weight of paper and this value appears to be optimum. To the stirred mixture of stock and water agitated at high speed for one minute to three minutes are added the caustic and surfactant in the form of aqueous solutions thereof. Alternatively, the surfactant and caustic may be added to the water in the pulper prior to the addition of the stock. The waste stock is retained in the treating solution until substantial defiberization takes place and the chemical binders in the ink are dissipated. Depending upon the degree of agitation in the reactor, the time in the reactor may vary between about 10 minutes and 50 minutes, and is usually between about 20 minutes and 40 minutes, and the temperature may vary from 25° C. to 100° C., preferably from 50° C. to 70° C.

Following dilution, the pulp is separated from the solution and washed and thickened by well known methods.

The recovered stock may be blended with fresh virgin sulfate or sulfite stock, or with additional recovered stock to make cellulosic articles.

Dependent on the brightness and whiteness of this stock it can be used without further chemical treatment (bleaching) as the base stock for business papers, as stock for fine papers (typing and writing) and for household and industrial papers (toweling, napkins, facial tissue, wiping papers, surgical and examining table covers, etc.) and for sanitary paper (toilet tissue). All the above-mentioned grades are white.

Dependent on the base tint of the deinked pulp it may be dyed to light, bright dyeings suitable for bond, business forms, toweling and napkin stock.

In the Examples which follow, the properties obtained from sheets which were prepared from the deinked stock were compared to unprinted portions of the various papers. Brightness, yellowness factor, tristimulus values, and physical strengths were determined on the deinked stock and compared to the unprinted paper. The use of the dominant wavelength in nanometers, percent purity, and percent luminosity afford very selective tools to differentiate between formulations as to their respective efficiency. The properties which are listed in the Tables are generally well known to those skilled in the art. For more specific information, reference can be made to the Handbook of Colorimetry prepared by the Massachusetts Institute of Technology, printed by the Technology Press, 1936, at Cambridge, Massachusetts. Briefly, however, the following definitions can be employed.

General Electric Brightness

General Electric brightness represents the percentage reflectance of light at 458 nanometers, measured on a General Electric Reflection Meter with the incident light being normal to the reflecting surface and the angle of reflectance being 45°.

Yellowness Factor

This value is calculated from a series of averaged readings by using the following formula:

$$A - B/G = \text{yellowness factor}$$

where A is equal to the reflectance using the end of filter, B is equal to the reflectance using the blue filter, and G is equal to the reflectance using the green filter. The readings were made employing a Hunter Reflection Meter.

Dominant Wavelength, Nanometers

This term describes or specifies a hue of the test specimen. It is read from a standard graph of $x$ and $y$ tristimulus values. Desirable values should be with ±2 nanometers of the standard.

Percent Purity

This term describes the strength or saturation of the hue described above. The lower the percent of purity, the weaker the saturation.

Percent Luminosity

The percent reflectance of the test specimen is at a wavelength of 550 nanometers.

EXAMPLES I–XV

These examples illustrate the results obtained in deinking various waste cellulosic stock in accordance with the process of the subject invention. Water was charged to a hydropulper and heated to a temperature of about 145° F. to 160° F. Thereafter, the stock was charged to the pulper (fiber concentration of 2.5%). After pulping this mixture for about one minute, a surfactant and sodium hydroxide were added. The pulper was then allowed to run for about 30 minutes at which time the temperature and pH of the solution were checked. The pulp was then discharged into a storage chest and washed with cold water. The pulp was thickened into a web and paper sheets made in the laboratory were subsequently prepared for testing. Results obtained on order sheets, 4-roll pack wrapper, and tabulating cards, are presented in the Tables I–III, below. In the following Tables, the anionic surfactant employed, designated as Surfactant A, was a phosphate monoester of the formula:

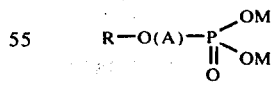

wherein M is hydrogen, R is a mixture of $C_{12}$–$C_{15}$ alkyl groups and A is a mixture of oxyethylene and oxypropylene groups in a weight ratio of 1.5:1, respectively, the oxyalkylene groups constituting about 63% by weight of the ester. Surfactant N is the nonionic surfactant employed in the preparation of Surfactant A. As the data presented in the following Tables illustrate, significant improvements in brightness were obtained by use of the anionic surfactants of the subject invention in lieu of the corresponding nonionic surfactants.

TABLE I

| | Order Sheets Examples | | | | | |
|---|---|---|---|---|---|---|
| | I | II | III | IV | V | VI |
| Time, minutes | 1.0 | 1.0 | 1.0 | 1.0 | 1.0 | 1.0 |
| Temperature, °C. | 50 | 60 | 60 | 60 | 60 | 60 |
| NaOH, % | — | 1.0 | 1.0 | 1.0 | 0.5 | 0.5 |
| Surfactant A, % | — | — | 0.5 | — | 0.5 | — |
| Surfactant N, % | — | — | — | 0.5 | — | 0.5 |
| pH | 7.6 | 10.0 | 9.8 | 9.7 | 9.1 | 8.4 |
| Properties | | | | | | |
| General Electric Brightness | 70.1 | 77.5 | 81.0 | 79.1 | 80.9 | 76.4 |
| Yellowness Factor | 0.06 | 0.08 | 0.05 | 0.03 | 0.06 | 0.02 |
| Dominant Wavelength, mμ | 580 | 589 | 585 | 560 | 578 | 580 |
| Purity, % | 3.0 | 4.0 | 2.0 | 1.0 | 3.0 | 1.0 |
| Luminosity, % | 72.4 | 81.7 | 83.5 | 79.6 | 85.3 | 77.2 |
| Improvement In Brightness, Points | — | 7.4 | 10.9 | 9.0 | 10.8 | 6.3 |

TABLE II

| | Toilet Paper Wrapper Examples | | | | | |
|---|---|---|---|---|---|---|
| | VII | VIII | IX | X | XI | XII |
| Time, minutes | 1.0 | 1.0 | 1.0 | 1.0 | 1.0 | 1.0 |
| Temperature, °C. | 55 | 70 | 70 | 70 | 70 | 70 |
| NaOH, % | — | 1.0 | 1.0 | 1.0 | 0.5 | 0.5 |
| Surfactant A, % | — | — | 0.5 | — | 0.5 | — |
| Surfactant N, % | — | — | — | 0.5 | — | 0.5 |
| pH | 7.6 | 9.8 | 9.3 | 9.8 | 8.3 | 8.5 |
| Properties | | | | | | |
| General Electric Brightness | 49.2 | 65.7 | 78.9 | 67.9 | 79.6 | 67.5 |
| Yellowness Factor | 0.02 | 0.05 | 0.05 | 0.04 | 0.06 | 0.03 |
| Dominant Wavelength, μ | 540 | 567 | 558 | 550 | 563 | 560 |
| Purity, % | 1.0 | 3.0 | 3.0 | 2.0 | 2.0 | 1.0 |
| Luminosity, % | 50.4 | 69.8 | 83.9 | 70.8 | 85.9 | 69.9 |
| Improvement In Brightness, Points | — | 16.5 | 29.7 | 18.7 | 30.4 | 18.3 |

TABLE III

| | Tabulating Cards Examples | | |
|---|---|---|---|
| | XIII | XIV | XV |
| Time, minutes | 1.0 | 1.0 | 1.0 |
| Temperature, °C. | 65 | 70 | 70 |
| NaOH, % | — | 1.0 | 0.5 |
| Surfactant A, % | — | 0.5 | 0.5 |
| pH | 7.6 | 9.6 | 8.6 |
| Properties | | | |
| General Electric Brightness | 51.0 | 70.0 | 66.9 |
| Yellowness Factor | 0.36 | 0.19 | 0.24 |
| Dominant Wavelength, mμ | 578 | 577 | 585 |
| Purity, % | 20 | 10 | 11 |
| Luminosity | 71.6 | 82.1 | 80.6 |
| Improvement In Brightness, Points | — | 19.0 | 15.9 |

The embodiments of the invention in which an exclusive property or privilege is claimed are defined as follows:

1. A process for the deinking of printed waste cellulosic stock which comprises pulping waste cellulosic stock in an aqueous solution containing based on the weight of the stock of from 0.5 to 2% by weight of an alkali metal hydroxide and from 0.3 to 0.7% by weight of a phosphate ester anionic surfactant which is a mixture of mono- and diesters having the formulae:

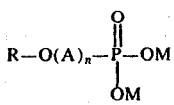

and

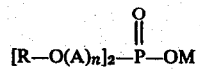

wherein M is hydrogen, ammonia, or an alkali metal, R is an alkyl group having from 10 to 18 carbon atoms or mixtures thereof, A is either oxyethylene or a mixture of oxyethylene and oxypropylene in a weight ratio of oxyethylene to oxypropylene of from 0.5:1 to 6:1 and wherein the mixture comprises from 60 to 100% by weight of monoester and from 40 to 0% by weight of diester and $n$ is an integer sufficiently large to insure that A constitutes from about 30 to 80% of the total weight of the ester.

2. The process of claim 1 wherein the phosphate ester corresponds to the formula:

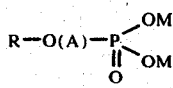

wherein M is hydrogen, R is a mixture of $C_{12}$–$C_{15}$ alkyl groups and A is a mixture of oxyethylene and oxypropylene groups in a weight ratio of 1.5:1, respectively, the oxyalkylene groups constituting about 63% by weight of the ester.

3. The process of claim 1 wherein the deinking is carried out at a temperature of from 25° C. to 100° C. for a period of between 10 minutes and 50 minutes.

4. The process of claim 1 wherein the alkali metal hydroxide is sodium hydroxide.

* * * * *